United States Patent [19]

Morinaga

[11] 4,300,733
[45] Nov. 17, 1981

[54] SEAT BELT TAKE-UP DEVICE PROVIDED WITH AN EMERGENCY-LOCKING MECHANISM

[75] Inventor: Masaru Morinaga, Yamato, Japan
[73] Assignee: NSK-Warner K.K., Tokyo, Japan
[21] Appl. No.: 105,141
[22] Filed: Dec. 19, 1979

[30] Foreign Application Priority Data

Dec. 29, 1978 [JP] Japan .................. 53-163078

[51] Int. Cl.³ ............... A62B 35/02; B65H 75/48
[52] U.S. Cl. ................ 242/107.4 A; 242/107.4 B
[58] Field of Search ............ 242/107.4 R–107.4 E; 280/806; 297/478, 480

[56] References Cited

U.S. PATENT DOCUMENTS

| | | | |
|---|---|---|---|
| 3,442,467 | 5/1969 | Stoffel | 242/107.4 B |
| 4,148,446 | 4/1979 | Sugar | 242/107.4 A |
| 4,168,810 | 9/1979 | Sack et al. | 242/107.4 B X |
| 4,228,970 | 10/1980 | Morinaga | 242/107.4 B X |

*Primary Examiner*—John M. Jillions
*Attorney, Agent, or Firm*—Shapiro and Shapiro

[57] ABSTRACT

A seat belt take-up device provided with an emergency-locking mechanism and having means for detecting a speed change of a vehicle above a predetermined value and in which webbing take-up means is locked upon detection of the speed change comprises a rotatable member provided concentrically with the take-up means and rotatable with the take-up means when in normal condition, stopping means for stopping the rotation of the rotatable member in response to the detecting means when there is a speed change of the vehicle above a predetermined value, a support member provided in axially juxtaposed relationship with the rotatable member and integrally with the take-up means, pawl means including at least one pawl member provided on the support member and capable of assuming a lock position and a non-lock position, the pawl member being normally in the non-lock position, an engaging member provided on the rotatable member for moving the pawl member to the lock position when the rotatable member is moved relative to the take-up means, and lock means engageable when the pawl member is moved to the lock position to stop rotation of the take-up means, the detecting means having an inertia member for sensing a webbing draw-out acceleration.

5 Claims, 4 Drawing Figures

SEAT BELT TAKE-UP DEVICE PROVIDED WITH AN EMERGENCY-LOCKING MECHANISM

BACKGROUND OF THE INVENTION

1. Field of the Invention

This invention relates to a seat belt take-up device for a vehicle, and more particularly to a seat belt take-up device provided with an emergency-locking mechanism for locking draw-out of webbing and safely restraining a seat occupant when there is a speed change of the vehicle above a predetermined value.

2. Description of the Prior Art

There have heretofore been proposed numerous seat belt take-up devices provided with emergency-locking mechanisms of such type, but these devices tend to have a complicated mechanism to accomplish emergency-lock with high accuracy and reliability and numerous expensive parts.

Seat belt take-up devices provided with conventional emergency-locking mechanisms, have been generally one of two types, namely, the type in which the draw-out acceleration of webbing is used as an agency to cause the emergency-locking mechanism to act and the type in which a speed change of a vehicle is directly sensed by an inertia displacement member such as a pendulum or the like to thereby cause the emergency-locking mechanism to act. Devices comprising these two types of devices combined together to provide more reliable emergency-locking of the seat belt take-up device have also been used, but such devices involve the necessity of incorporating two complicated emergency-locking mechanisms into a single take-up device and this leads to bulkiness of the entire device and expensiveness of the device resulting from a greater number of parts.

SUMMARY OF THE INVENTION

It is therefore an object of the present invention to provide an emergency-locking type seat belt take-up device which is relatively simple in design but reliable in operation.

It is a further object of the present invention to provide an emergency-locking type seat belt take-up device provided with a so-called dual type emergency-locking mechanism in which an emergency-locking mechanism operable upon sensing of a draw-out acceleration of webbing and an emergency-locking mechanism operable upon sensing of a speed change of a vehicle are constituted by common parts.

To achieve these objects, the present invention provides a seat belt take-up device with an emergency-locking mechanism and having means for detecting a speed change of a vehicle above a predetermined value and in which webbing take-up means is locked upon detection of said speed change, said device comprising at least in one preferred embodiment a rotatable member separate from said take-up means but provided concentrically with said take-up means and rotatable with said take-up means when in normal condition, stopping means for stopping the rotation of said rotatable member in response to said detecting means when there is a speed change of the vehicle above a predetermined value, a support member provided in axially juxtaposed relationship with said rotatable member and integrally with said take-up means, pawl means including at least one pawl member provided on said support member and capable of assuming a lock position and a non-lock position, said pawl member being normally in said non-lock position, an engaging member provided on said rotatable member for moving said pawl member to said lock position when said rotatable member is moved relative to said take-up means, and lock means engageable when said pawl member is moved to said lock position to stop rotation of said take-up means, said detecting means having an inertia member for sensing a webbing draw-out acceleration.

The invention will become more fully apparent from the following detailed description of a preferred embodiment thereof taken in conjunction with the accompanying drawings.

DESCRIPTION OF THE PREFERRED EMBODIMENTS

Figure 1:
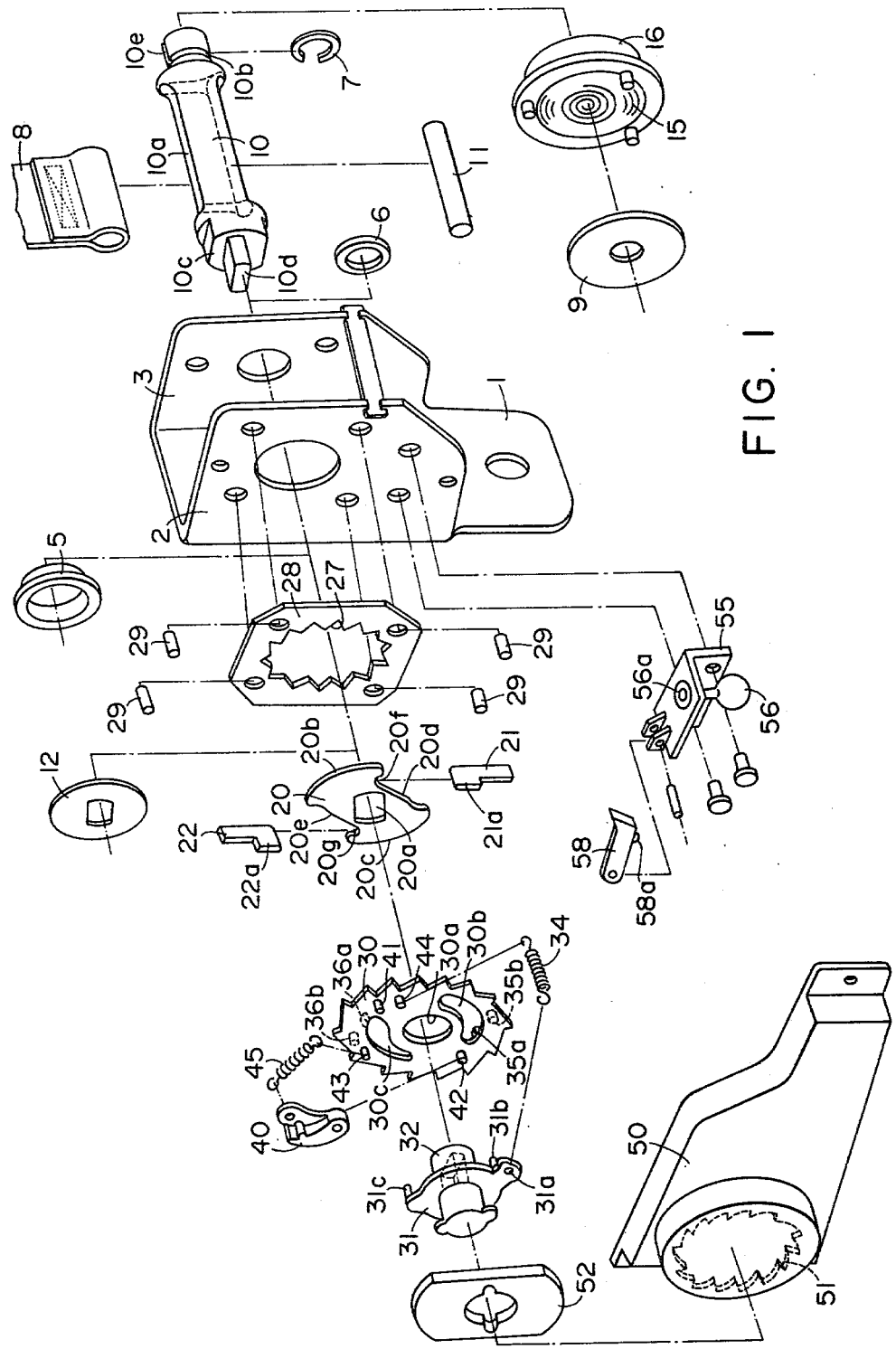
FIG. 1 is an exploded perspective view of components of a seat belt take-up device in accordance with an embodiment of the present invention.

Referring to the drawings, a housing 1 of a seat belt take-up device (retractor), has integrally formed therewith side plates 2 and 3 extending parallel in opposed relationship with each other, and take-up means for webbing is rotatably journalled in opposed holes formed substantially centrally in these side plates 2 and 3, through bushings 5 and 6. The take-up means may be a conventional one, and in the present embodiment, comprises for example a metallic spool member 10 and a shaft member 11 of synthetic resin. The spool member 10 is formed with a slot 10a therethrough having one narrow lengthwise opening and one wide lengthwise opening. The right end of the spool member is formed with a flanged portion, a circumferential groove 10b for receiving therein a washer 7, and a lengthwise slit 10e while the left end thereof is formed with a flanged portion, a large flattened portion 10c and a narrow flattened portion 10d. The shaft member 11 is a bar secured in the slot 10a of the spool member and having a diameter larger than the narrow end of the slot 10a and smaller than the wide end of the slot 10a, and this shaft member 11 passes through the turned-back end of the webbing 8 to secure the webbing 8 to the take-up means.

The inner end of a take-up spring 15 is hooked to the slit 10e located at the right end of the spool member 10 and the outer end thereof is hooked to a cover 16 secured to the side wall 3 and thus, the take-up spring biases the take-up means in the webbing take-up direction (counter-clockwise direction as viewed in FIG. 1). A disc 9 having a hole therein locates the take-up spring 15.

Description will now be made of an emergency-locking mechanism which is an essential part of the present invention.

The left end portion of the spool member 10 extends outwardly of the side plate 2, and a disc 12 having a flattened hole therein and a support member 20 is secured to that left end portion of the strength member. In the present embodiment, a slot 20a corresponding in shape to portion 10c of the spool member 10 is formed in the central portion of the support member 20 and portion 10c of member 10 is fitted in the slot 20a, whereby the support member 20 is secured to the member 10 for rotation therewith. The support member 20 has a pair of diametrically opposed outer circumferential portions 20b, 20c and a pair of cut-outs 20d, 20e formed between these outer circumferential portions. The portions at which the cut-outs 20d, 20e are adjacent to the outer circumferential portions 20b, 20c are formed as recesses 20f and 20g, and pawl members 21 and 22 contained in the cut-outs 20d and 20e are pivotally supported substantially about those recesses. The disc 12 is for preventing the ends of the pawl members 21 and 22 adjacent to the side plate 2 from rubbing against the outer surface of the side plate 2 when the pawl members 21 and 22 are rotated with the take-up means.

Radially outwardly of the support member 20 and the pawl members 21 and 22, lock means 28 having a ratchet internal gear 27 is secured onto the side plate 2 by pins 29. The diameter of the addendum circle of the internal gear 27 is greater than the maximum diameter of the support member 20 and, when the pawl members 21, 22 are in their inner position to be described, namely, in their non-lock position, the pawl members are out of engagement with the ratchet internal gear 27, but when the pawl members are in their outer position, namely, in their lock position, the pawl members are engaged with the ratchet internal gear 27 to lock the rotation of the take-up means in the webbing draw-out direction (clockwise direction as viewed in FIG. 1, as will be described).

On the left side of the support member 20 and coaxially with this support member, a ratchet plate 30 defining a rotatable member is rotatably supported on a shaft 32 of a keep member 31 fitted in a center hole 30a of the ratchet plate 30. The portion 10d of member 10 is fitted within the shaft 32 of the keep member 31, and the keep member 31 is secured to member 10. Consequently, the keep member 31 and member 10 are rotatable together. Two slots 30b and 30c are formed in the ratchet plate 30 circumferentially thereof and pins 31b and 31c provided on the keep member 31 project through the slots 30b and 30c and engage the inner ends of the projected portions 21a and 22a of the pawl members 21 and 22. By this arrangement, the pawl members 21 and 22 are stably contained in the cut-outs 20d and 20e of the support member 20. On that side of the ratchet plate 30 which is adjacent to the support member 20, there are provided two pairs of diametrically opposed projections 35a, 36a and 35b, 36b, and the end portion of the pawl member 21 extends between the projections 35a and 35b and the end portion of the pawl member 22 extends between the projections 36a and 36b. Thus, when the ratchet plate 30 is in its normal condition to be described, it holds the pawl members 21 and 22 in said lock position. A coil spring 34 having one end hooked in the hole 31a of the keep member and the other end hooked to a pin 44 studded in the ratchet plate 30 is interposed between the ratchet plate 30 and the keep member 31 so as to bias the ratchet plate 30 in clockwise direction as viewed in FIG. 1 with respect to the keep member 31. By this biasing force, the ratchet plate 30 in its normal condition assumes a first position in which it holds the pawl members 21 and 22 in the aforementioned non-lock position by means of the two pairs of projections 35a, 36a and 35b, 36b. At this time, the projections 35a and 36a bear against the edges opposite to that side on which there are the recesses 20f and 20g of the cut-outs 20d and 20e of the support member 20, thereby preventing further rotation of the ratchet plate 30. When the take-up means is rotated in the webbing take-up direction and in the webbing draw-out direction, the projections 35a and 36a of the ratchet plate 30 are urged against the aforementioned edges of the cut-outs 20d and 20e of the support member 20 by the biasing force of the coil spring 34, whereby the ratchet plate 30 is also rotated in the same direction while the pawl members 21 and 22 remain held in the aforementioned non-lock position. Accordingly, in normal conditions, the webbing can be taken-up and drawn out with the pawl members 21 and 22 remaining held in non-lock position. However, if only the ratchet plate 30 is stopped when the take-up means and accordingly the ratchet plate 30, the keep member 31, etc. are being rotated in the webbing draw-out direction, the take-up means side including the support member 20 continues to rotate in clockwise direction as viewed in FIG. 1 and therefore, the ratchet plate 30 is delayed relative to the rotation of the support member 20 and the keep member 31 and is relatively rotated in counterclockwise direction against the biasing force of the coil spring 34, so that the pawl members 21 and 22 are guided by the projections 35a, 35b and 36a, 36b, respectively, of the ratchet plate 30 and are caused to rock outwardly into said lock position substantially about that end at which there are the projected portions 21a and 22a, and mesh with the ratchet internal gear 27 of the lock means 28 to thereby lock the take-up means.

Stopping the ratchet plate 30 may be accomplished by detecting a speed change of the vehicle above a predetermined value or by detecting the draw-out acceleration of the webbing. Preferably, both these two detections are used.

In the present embodiment, a support plate 55 is secured to the lower portion of the side plate 2 and a pendulum member 56 for sensing a speed change of the vehicle above a predetermined value is swingably suspended from the support plate 55. A swinging pawl member 58 is also swingably supported on the support plate 55. A downwardly facing projection 58a is formed on the underside of the end of the swinging pawl member 58 and rests on a dish-like enlarged portion 56a formed on the upper end of the pendulum member 56. When the pendulum member 56 detects a speed change of the vehicle above a predetermined value and is inclined more than a predetermined amount, the swinging pawl member 58 is caused to pivot counter-clockwise as viewed in FIG. 1 by the dish-like enlarged portion 56a and meshes with a ratchet tooth of the ratchet plate 30 to stop the rotation thereof in the webbing draw-out direction. Therefore, in the process as previously described, the pawl members 21 and 22 mesh with the internal ratchet gear 27 of the lock means 28 to lock the rotation of the take-up means in the webbing draw-out direction. In the present embodiment, a pendulum type inertia displacement member has been exemplarily shown as the speed change sensing means, whereas it is of course also possible to use a known ball type inertia displacement member or an inertia displacement member adapted to tilt down when subjected to a speed change exceeding a predetermined value.

Figures 2, 3:
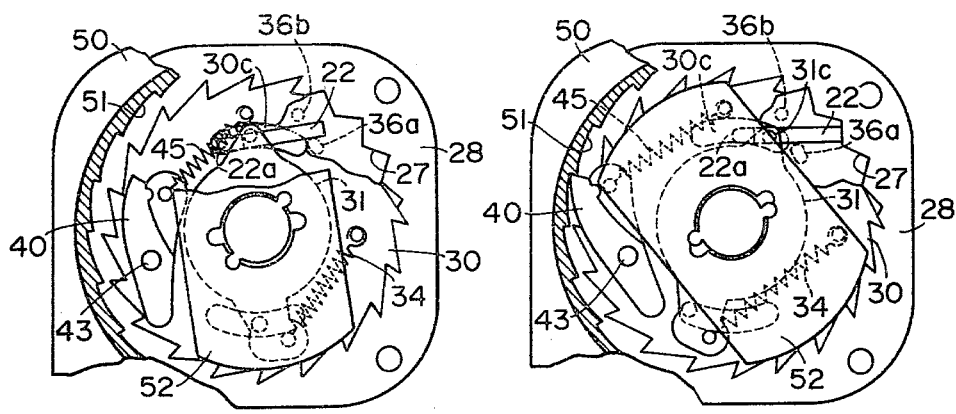
FIGS. 2 and 3 are views illustrating the function of the webbing draw-out acceleration sensing type emergency-locking mechanism in the embodiment of FIG. 1.
Figure 4:
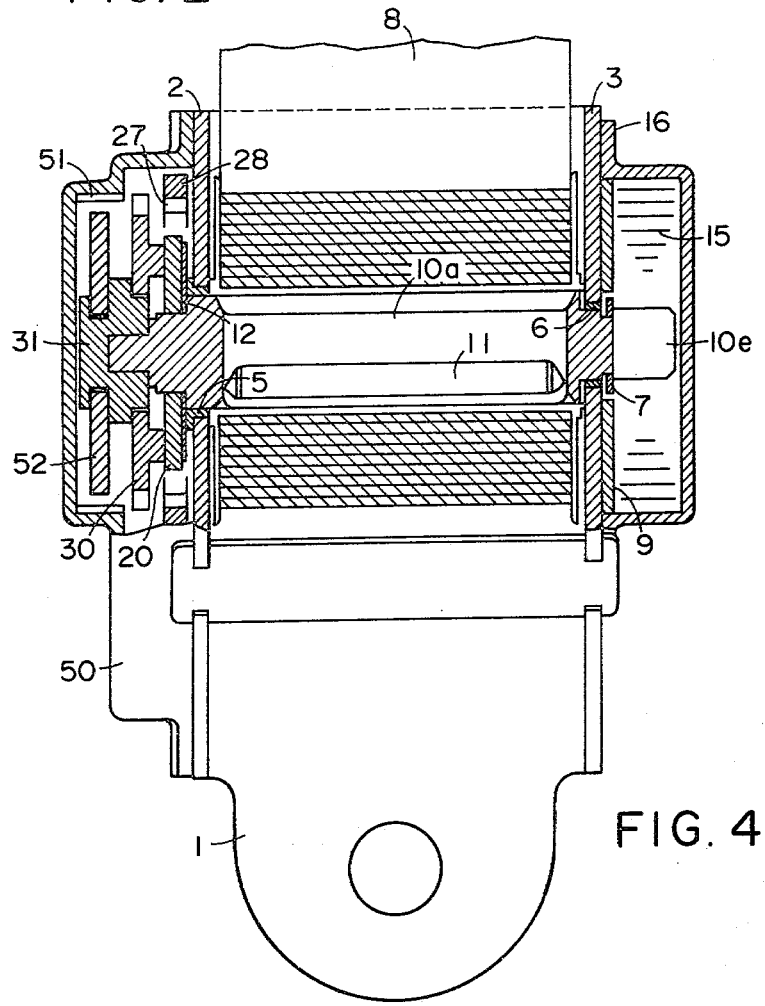
FIG. 4 is a cross-sectional view of the assembled components shown in FIG. 1.

In the present embodiment, webbing draw-out acceleration sensing means is also exemplarily shown. A weight plate 52 forming an inertia member is rotatably supported at the left end of the keep member 31. The mounting of this weight plate 52 to the keep member 31 may be accomplished by first aligning the hole of the weight plate 52 identical in shape to the left end of the keep member 31 with the left end of the keep member 31 and fitting the hole over this left end and thereafter rotating the weight plate 52 to some extent. A pawl member 40 is supported on a pin 42 studded on the ratchet plate 30 and this pawl member is biased in a clockwise direction as viewed in FIG. 1 by a coil spring 45 having one end hooked to a pin 43 studded in the ratchet plate 30 and the other end hooked in the hole of the pawl member 40. Thus, the weight plate 52 in its normal condition is urged against the projection 41 of the ratchet plate 30 by the aforementioned pawl member 40. Further, an internal ratchet gear 51 is formed on the inner wall of the cylindrical portion of a cover member 50 secured onto the side plate 2 to cover the emergency-locking mechanism and surrounding the ratchet plate 30. When the pawl member 40 on the ratchet plate 30 is at its inner position by being clockwisely rotated by the biasing force of the coil spring 45, namely, when it is in its normal condition (FIG. 2), the pawl member 40 is out of engagement with the internal ratchet gear 51 of the cover member. However, when the take-up means is rotated at an angular acceleration above a predetermined value in the webbing draw-out direction, the weight plate 52 cannot follow this rotation of the take-up means due to the inertia action but is counter-clockwisely rotated relative to the ratchet plate 30 against the biasing force of the coil spring 45 through the pawl member 40 and accordingly, the pawl member 40 on the ratchet plate 30 is also rotated counter-clockwisely to its outer position, where it meshes with the internal ratchet gear 51 of the cover member (FIG. 3). As a result, the ratchet plate 30 is stopped and by the same process as that described previously, the rotation of the take-up means in the webbing draw-out direction is locked.

According to the present invention, as has been described above, there is realized a device acting as an emergency-locking mechanism which may operate by positively and sensitively detecting a webbing draw-out acceleration during an emergency such as a collision or the like, namely, when a speed change above a predetermined value is exerted on the vehicle, or acting as an emergency-locking mechanism which may operate by directly detecting said speed change of the vehicle, and there is also realized a device which can perform both of these two functions.

I claim:

1. A seat belt retractor for use in a vehicle, the retractor including a housing, a webbing take-up shaft journalled in the housing, the shaft being biased in a webbing retracting direction, and an emergency-locking mechanism comprising:
    a rotatable member supported on said shaft in a manner permitting relative rotation between said member and said shaft;
    a support member non-rotatably supported on said shaft in axially adjacent relationship to said rotatable member;
    a first pawl member associated with said support member for movement between a lock position and a normal non-lock position, said first pawl member being biased toward said normal non-lock position;
    engaging means on said rotatable member for displacing said first pawl member from said normal non-lock position to said lock position responsive to relative rotation occurring between said rotatable member and said shaft;
    first lock means associated with said housing for engaging said first pawl member when said first pawl member is displaced into said lock position, thereby restraining said first pawl member and arresting rotation of said support member and said shaft;
    a second pawl member supported on said rotatable member for movement between a lock position and a normal non-lock position;
    means biasing said second pawl member to its normal non-lock position;
    means for providing rotation of said rotatable member with said shaft when said shaft is rotated from rest in a webbing draw-out direction;
    an inertia member rotatably supported on said shaft for engagement with said second pawl member, said inertia member being displaceable relative to said shaft by inertial force from a normal first position to a second position responsive to an angular acceleration of said shaft in the webbing draw-out direction above a predetermined value, displacement of said inertia member from said first position to said second position effecting movement of said second pawl member from its normal non-lock position to its lock position; and
    second lock means associated with said housing for engaging said second pawl member when said second pawl member is displaced to its lock position, so as to arrest said second pawl member and said rotatable member, thereby establishing relative rotation between said rotatable member and said shaft effective for displacing said first pawl member from its non-lock to its lock position whereby said first pawl member engages said first lock means to arrest the rotation of said shaft.

2. A device in accordance with claim 1, further comprising detecting means for directly detecting a speed change of a vehicle above a predetermined value and stopping means for arresting said rotatable member in response to said detecting means detecting a speed change above said predetermined value thereby providing relative rotation between said rotatable member and said shaft effective to arrest said shaft when said shaft is urged in the webbing draw-out direction.

3. A device in accordance with claim 1 or claim 2, wherein said first and second lock means comprise internal ratchet gears capable of meshing with said first and second pawl members respectively.

4. A device in accordance with claim 1 or claim 2, wherein said engaging means comprises projections embracing said first pawl member.

5. A device in accordance with claim 2, wherein said rotatable member is an external ratchet gear, and said stopping means includes a third pawl member capable of pivotal displacement from a normal first position to a second position in which said third pawl member meshes with and arrests said external ratchet gear.

* * * * *